United States Patent [19]
Terada et al.

[11] Patent Number: 5,725,959
[45] Date of Patent: Mar. 10, 1998

[54] ANTIREFLECTION FILM FOR PLASTIC OPTICAL ELEMENT

[75] Inventors: Junji Terada, Hiratsuka; Makoto Kameyama, Funabashi; Junichi Sakamoto, Yokohama, all of Japan

[73] Assignee: Canon Kabushiki Kaisha, Tokyo, Japan

[21] Appl. No.: 754,475

[22] Filed: Nov. 22, 1996

Related U.S. Application Data

[63] Continuation of Ser. No. 212,837, Mar. 15, 1994, abandoned.

[30] Foreign Application Priority Data

Mar. 18, 1993 [JP] Japan .................. 5-084092
May 28, 1993 [JP] Japan .................. 5-151503

[51] Int. Cl.⁶ .......................................... B32B 9/04
[52] U.S. Cl. .................. 428/448; 428/335; 428/451; 428/697; 428/699; 428/701; 428/702; 359/359; 359/582; 359/586; 359/588
[58] Field of Search ................... 428/335, 448, 428/451, 697, 699, 701, 702, 412, 477.7; 359/582, 586, 588, 359

[56] References Cited

U.S. PATENT DOCUMENTS

| | | | |
|---|---|---|---|
| 3,858,977 | 1/1975 | Baird | 359/582 |
| 4,497,539 | 2/1985 | Sakurai | 359/586 |
| 4,784,467 | 11/1988 | Akatsuka | 359/588 |
| 4,805,989 | 2/1989 | Nakajima | 359/588 |
| 4,957,358 | 9/1990 | Terada et al. | 350/588 |
| 5,105,310 | 4/1992 | Dickey | 359/586 |
| 5,181,141 | 1/1993 | Sato | 359/582 |
| 5,270,858 | 12/1993 | Dickey | 359/582 |
| 5,362,552 | 11/1994 | Austin | 359/586 |

FOREIGN PATENT DOCUMENTS

| | | |
|---|---|---|
| 60-22510 | 2/1985 | Japan . |
| 60-25101 | 2/1985 | Japan . |
| 60-98401 | 6/1985 | Japan . |
| 60-225101 | 11/1985 | Japan . |
| 3-16101 | 1/1991 | Japan . |
| 3-116101 | 5/1991 | Japan . |

*Primary Examiner*—Timothy Speer
*Attorney, Agent, or Firm*—Fitzpatrick, Cella, Harper & Scinto

[57] ABSTRACT

An antireflection film is procided on a plastic optical element as follows. An undercoat composed principally of unsaturated silicon exide $SiO_x$ ($2>x>1$) with a thickness within a range of 200 to 300 nm is formed on the optical element. A multi-layered film of a repeating structure is formed on the undercoat. The multi-layerd film has antireflective characteristics. The undercoat has a refractive index within a range of 1.49 to 1.59. The multi-layered film is composed of alternate lamination of a layer of a material which has a high refractive index and which is composed principally of $TiO_2$, $ZrO_2$ or a mixture thereof, and a layer of a material which has a low refractive index and which is composed principally of $SiO_x$ ($2 \geq x \geq 1$).

12 Claims, 9 Drawing Sheets

ANTIREFLECTION FILM FOR PLASTIC OPTICAL ELEMENT

This application is a continuation of application Ser. No. 08/212,837 filed Mar. 15, 1994, now abandoned.

BACKGROUND OF THE INVENTION

1. Field of the Invention

The present invention relates to an antireflection film for preventing surface reflection of an optical element of a plastic material, such as a plastic lens.

2. Related Background Art

For preventing surface reflection of an optical element such as an optical lens, there have conventionally been proposed a method of forming a thin film of silicon oxide $SiO_x$, and a method of forming a multi-layered antireflection film consisting of alternately evaporated films of a material of a high refractive index such as $ZrO_2$, $TiO_2$, $CaO_2$ or $Ta_2O_5$ and of a material of a low refractive index such as $MgF_2$ or $SiO_2$. Particularly for an optical element of a plastic material, such as a plastic lens, in order to cover the insufficient surface hardness and chemical resistance, there is often used a thin film of silicon oxide $SiO_x$, excellent in hardness and chemical resistance, as the first layer or an intermediate layer of the antireflection film.

For example, the Japanese Patent Laid-Open Application No. 60-98401 proposes a two-layered antireflection film consisting of a quarter wavelength film (hereinafter written as λ/4film) of SiO, evaporated on the surface of an acrylic lens and having a refractive index of 1.55 or higher and a thickness of 89 nm or less, and a λ/4 film of $MgF_2$ having a refractive index of 1.38, and the Japanese Patent Laid-Open Application No. 60-225101 proposes a five-layered antireflection film for a design wavelength $\lambda_0$=520 nm, consisting of a $SiO_2$ film formed as the first layer by vacuum evaporation and having a refractive index n=1.47, a film thickness d=354 nm and an optical thickness nd=$\lambda_0$; and, laminated thereon in succession, a $Ta_2O_5$ film having a refractive index n=2.05 and an optical thickness nd=0.057 $\lambda_0$; a $SiO_2$ film having a refractive index n=1.47 and an optical thickness nd=0.11 $\lambda_0$; a $Ta_2O_5$ film having a refractive index n=2.05 and an optical thickness nd=0.538 $\lambda_0$; and a $SiO_2$ film having a refractive index n=1.47 and an optical thickness nd=0.258 $\lambda_0$. Also the Japanese Patent Laid-Open Application No. 3-116101 proposes a five-layered antireflection film (design wavelength $\lambda_0$=550–570 nm) consisting of a $SiO_x$ film formed as the first layer by vacuum evaporation on a molded methacrylic resinous substrate and having a refractive index n=1.60 and an optical thickness nd=($\lambda_0$/4)×20% (d=17–18 nm); and, laminated in succession thereon, a $TiO_2$ film having a refractive index n=1.95 and an optical thickness nd=($\lambda_0$/4)×20%; a $SiO_2$ film having a refractive index n=1.45 and an optical thickness nd=($\lambda_0$/4) ×40 %; a $TiO_2$ film having a refractive index n=2.0 and an optical thickness nd=($\lambda_0$/4)×70%; and a $SiO_2$ film having a refractive index n=1.45 and an optical thickness nd=($\lambda_0$/4) ×95%.

However, such films of the above-explained prior technologies, though being free from significant deterioration of the performance in use under limited condition such as in the living space, may result in deterioration in abrasion resistance or chemical resistance, or formation of cracks due to thermal distortion of the plastic substrate, eventually leading to film peeling, if they are exposed to harsh outdoor temperature conditions or are used for a prolonged period under a condition involving significant changes in temperature or humidity.

Also the quality evaluation test to be explained later has revealed that the antireflection films disclosed in the aforementioned Japanese Patent Laid-Open Application Nos. 60-98401 and 3-116101 are insufficient in the abrasion resistance and chemical resistance even immediately after the film formation, and that the antireflection film disclosed in the Japanese Patent Laid-Open Application No. 60-22510 is deficient in the optical characteristics, having an absorbance of ca. 3% to the light of the visible region.

SUMMARY OF THE INVENTION

In consideration of the unresolved drawbacks of the above-explained conventional technologies, the object of the present invention is to provide an antireflection film which is adapted for use in a plastic optical element and which is excellent in the abrasion resistance, chemical resistance and optical characteristics, and free from deterioration of these properties or crack formation or film peeling even in the prolonged use under harsh conditions of temperature or humidity or under conditions involving significant changes in the temperature or humidity.

The above-mentioned object can be attained, according to the present invention, by an antireflection film consisting of an undercoat principally composed of unsaturated silicon oxide $SiO_X$ (2>x>1), formed on the surface of a plastic optical element and having a film thickness d within a range from 200 to 300 nm, and a multi-layered film of repeating structure, having antireflective characteristics and formed on said undercoat, The above-mentioned multi-layered film of repeating structure is advantageously composed of alternate lamination of a film of a material of a high refractive index principally composed of $TiO_2$, $ZrO_2$ or a mixture thereof, and a film of a material of a low refractive index principally composed of $SiO_x$ (2≧x≧1).

The above-mentioned configuration improves the abrasion resistance, chemical resistance and adhesion to the plastic material by the use of a film principally composed of unsaturated silicon oxide $SiO_x$ (2>x>1), which is excellent in hardness, chemical resistance and adhesion to the plastic material, as an undercoat not involved in the antireflection characteristics. A thickness of the undercoat at least equal to 200 nm provides sufficient improvement in the abrasion resistance and chemical resistance, and also enables improvement in the durability under harsh conditions of temperature and humidity, such as those in outdoor use. Also the antireflection film can be maintained free from crack formation or film peeling, even in the prolonged use under the above-mentioned harsh conditions, if the thickness of the undercoat does not exceed 300 nm.

Further, in order to attain the above-mentioned object, the antireflection film of the present invention for use in a plastic optical element is featured by an undercoat of silicon oxide formed on the surface of a plastic optical element, and a multi-layered film having at least six layers and laminated on said undercoat, wherein said multi-layered film has specific antireflective characteristics to the light including at least visible and near-infrared spectral regions.

The undercoat is preferably composed of unsaturated silicon oxide having refractive index n and film thickness d within the following ranges:

$1.45 \leq n \leq 1.60$ $290 \leq nd \leq 480 (nm)$

Also the multi-layered film is preferably composed of alternate lamination of a film of a material of a high refractive index composed of zirconium oxide and titanium oxide, and a film of a material of a low refractive index composed of silicon dioxide.

In the known 4-layered antireflection film composed of thin films of optical thicknesses of λ/4 and λ/2, the antireflective characteristics for the light of a wide spectral range including the visible and near-infrared regions can be significantly improved by expanding the antireflective range, by constituting at least one of the above-mentioned films with a two-or three-layered equivalent film, thus increasing the number of the entire layers to at least six.

The undercoat consisting of unsaturated silicon oxide and having an optical thickness nd of 200 nm or larger can prevent thermal expansion of the plastic optical element, thereby preventing crack formation in the multi-layered film, and also can improve the chemical resistance etc. On the other hand, an optical thickness nd larger than 480 nm results in an increase in the internal stress and light absorption in the undercoat, thereby deteriorating the adhesion to the surface of the plastic element. Also the undercoat preferably has a refractive index within a range from 1.45 to 1.60, since a refractive index larger than 1.60 results in an increased internal stress while a refractive index smaller than 1.45 leads to the formation of a porous film.

The material of high refractive index consisting of zirconium oxide and titanium oxide is inexpensive, has a high refractive index and is free from the danger of complete fusion in the course of film formation, so that it is free from troubles of surface denaturing of the plastic optical element by heat radiation, or of gas generation. Also the material of low refractive index, consisting of silicon dioxide, can provide a highly hard film even by film formation without heating of the surface of the plastic optical element, thereby being effective for improving the abrasion resistance and chemical resistance thereof.

DETAILED DESCRIPTION OF THE PREFERRED EMBODIMENTS

Now the antireflection film of the present invention will be clarified by preferred embodiments thereof, with reference to the attached drawings.

Figure 1:
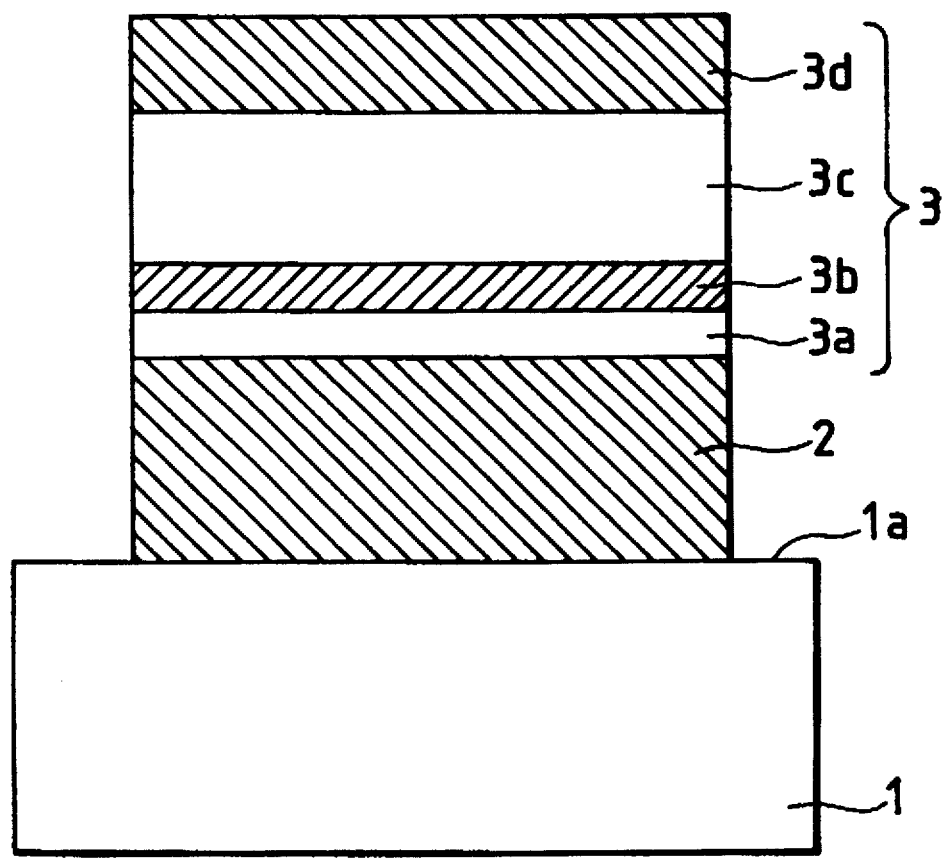
FIG. 1 is a schematic cross-sectional view of a first embodiment of the antireflection film of the present invention.

FIG. 1 is a schematic cross-sectional view of a 1st embodiment, wherein the antireflection film E1 of the present embodiment for use in a plastic optical element is composed of an undercoat 2, formed by evaporation on a surface 1a of a plastic lens 1 made of polymethyl methacrylate (PMMA), and a multi-layered film 3 of a repeating structure, laminated thereon. The undercoat 2 is a thin film of a thickness d within a range from 200 to 300 nm of a material of a low refractive index within a range from 1.49 to 1.59, principally composed of unsaturated silicon oxide $SiO_x$ (2>x>1) showing satisfactory adhesion to the above-mentioned plastic material and having excellent chemical and abrasion resistances. The multi-layered film 3 consists of a 1st-layer film (hereinafter simply called 1st layer) of a material of a high refractive index, principally composed of titanium oxide $TiO_2$, zirconium oxide $ZrO_2$ or a mixture thereof; a 2nd-layer film 3b (hereinafter simply called 2nd layer) of a material of a low refractive index, principally composed of silicon oxide $SiO_x$ (2≧x≧1); a 3rd-layer film 3c (hereinafter simply called 3rd layer) of a material or a high refractive index, principally composed of titanium oxide $TiO_2$, zirconium oxide $ZrO_2$ or a mixture thereof; and a 3th-layer film 3d (hereinafter simply called 4th layer) of a material of a low refractive index, principally composed of silicon oxide $SiO_x$ (2≧x≧1).

For the undercoat 2, the above-mentioned material of low refractive index, principally composed of unsaturated silicon oxide with a refractive index within a range from 1.49 to 1.59 is selected, because the refractive index of polymethyl methacrylate (PMMA), polycarbonate (PC) or polystyrene (PS), frequently used as the material for plastic optical elements, is within the above-mentioned range, and because the above-mentioned material of low refractive index is excellent in the chemical and abrasion resistances, also in the adhesion to the above-mentioned plastic materials, and shows little scattering and absorption of the light when used as the undercoat.

It has been experimentally shown that a thickness of the undercoat 2 smaller than 200 nm cannot provide sufficient chemical or abrasion resistance, while a thickness exceeding 300 nm tends to lead to crack formation. In the multi-layered film 3, the 1st layer 3a and the 2nd layer 3b constitute an equivalent thin film consisting of a material of a high refractive index and a material of a low refractive index, so that the basic configuration of the multi-layered film 3 consists, for a design wavelength λ, of the above-mentioned equivalent film of a thickness of λ/4, the 3rd layer 3c of a thickness of λ/4 or λ/2, and the 4th layer 3d of a thickness of λ/4. In the multi-layered film 3, the refractive index n and the optical thickness nd of the respective layers 3a to 3d are preferably within the following ranges:

| | refractive index n | optical thickness nd |
|---|---|---|
| 1st layer 3a | 1.95–2.15 | 0.05λ–0.13λ |
| 2nd layer 3b | 1.43–1.55 | 0.03λ–0.07λ |
| 3rd layer 3c | 1.95–2.15 | 0.21λ–0.49λ |
| 4th layer 3d | 1.43–1.55 | 0.20λ–0.28λ | wherein basic wavelength λ = 500 nm.

In the following there will be explained the manufacturing process for the antireflection film of the present invention.

At first, a plastic lens 1 of polymethyl methacrylate (PMMA) was placed in a known vacuum evaporation chamber, which was evacuated to high vacuum of $3 \times 10^{-5}$ Torr or lower and was charged with $O_2$ gas to a pressure of $1.0 \times 10^{-4}$ Torr. Then an evaporation material, principally composed of unsaturated silicon oxide $SiO_x$ (2>x>1), was evaporated by resistance heating or electron beam heating, thereby forming the undercoat 2 of an optical thickness nd=330 nm, on the surface 1a of the plastic lens 1, with an evaporate rate of 10 Å/sec. Then the $O_2$ gas flow rate was regulated to a pressure of $5 \times 10^{-5}$ Torr in the vacuum evaporation chamber, and an evaporation material principally composed of $ZrO_2$ and $TiO_2$ was evaporated by electron beam heating to form the 1st layer 3a of the multi-layered film 3, with an optical thickness nd=36 nm and with an evaporation rate of 5 Å/sec. The $O_2$ flow rate was further controlled to bring the pressure of the vacuum evaporation chamber to $1.0 \times 10^{-4}$ Torr, and an evaporation material principally composed of $SiO_2$ was evaporated by electron beam heating to form the 2nd layer 3b, with an optical thickness nd=24 nm and with an evaporation rate of 10 Å/sec. Subsequently the $O_2$ flow rate was controlled to bring the pressure of the vacuum evaporation chamber to $5 \times 10^{-5}$ Torr, and an evaporation material principally composed of a mixture of $ZrO_{2\ 2}$ and $TiO_2$ was evaporated by electron beam heating to form the 3rd layer 3c with an optical thickness nd=210 nm and with an evaporation rate of 5 Å/sec. Finally the $O_2$ flow rate was controlled to bring the pressure of the vacuum evaporation chamber to $1.0 \times 10^{-4}$ Torr, and an evaporation material principally composed of $SiO_2$ was evaporated by electron beam heating to form the 4th layer 3d with an optical thickness nd=115 nm and with an evaporate rate of 10 Å/sec. Subsequently $O_2$ introduction was terminated, then the pressure of the vacuum evaporation chamber was once reduced to high vacuum of $3 \times 10^{-5}$ Torr or lower and then brought to the atmospheric pressure, and the product was taken out by opening the chamber.

Figure 2:
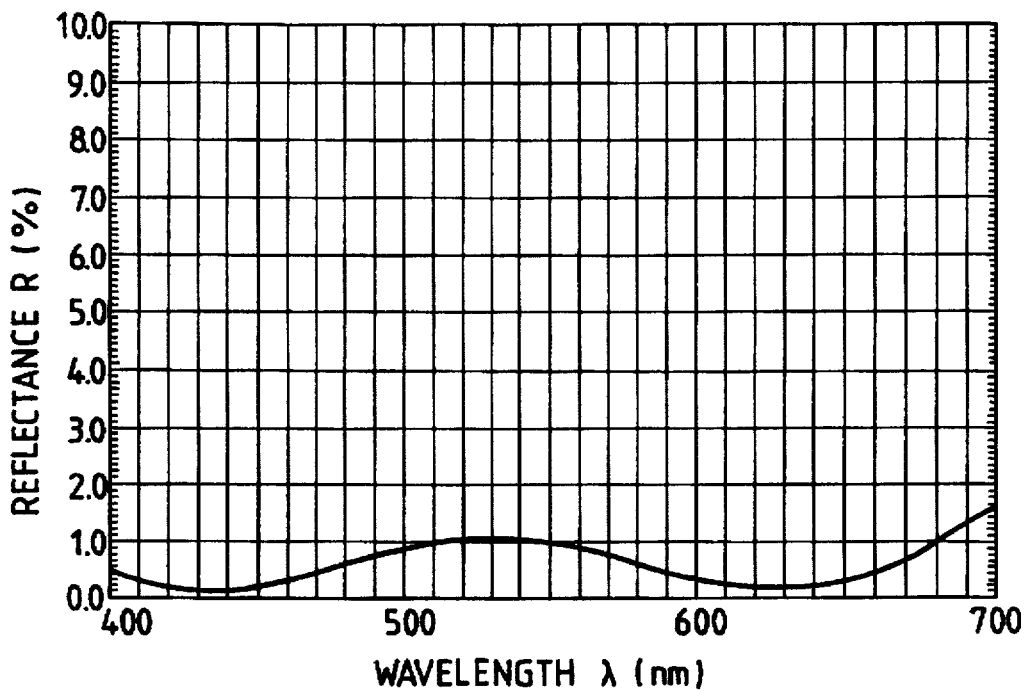
FIG. 2 is a chart showing the antireflective characteristics of the antireflection film shown in FIG. 1.

Table 1 shows the material, refractive index n, thickness d and optical thickness nd of respective films in thus prepared antireflection film E1, and the antireflection characteristics of said film are shown in FIG. 2.

TABLE 1

| Composition | Material | Refractive index at 587 nm | Optical thickness nd(d) | |
|---|---|---|---|---|
| | | | nm (nm) | λ = 460 nm |
| 4th layer of multi-layered film | $SiO_2$ | 1.47 | 115 | 0.25λ |
| 3rd layer of multi-layered film | $ZrO_2/TiO_2$ mixture | 2.01 | 210 | 0.45λ |
| 2nd layer of multi-layered film | $SiO_2$ | 1.47 | 22 | 0.04λ |

TABLE 1-continued

| Composition | Material | Refractive index at 587 nm | Optical thickness nd(d) | |
|---|---|---|---|---|
| | | | nm (nm) | λ = 460 nm |
| 1st layer of multi-layered film | $ZrO_2/TiO_2$ mixture | 2.01 | 36 | 0.07λ |
| Undercoat | $SiO_x$ (2 > x > 1) | 1.55 | 330(208) | 0.71λ |
| Plastic lens | PMMA | 1.49 | — | — |

Then, antireflection films E2–E4 of 1st to 3rd variations were prepared by modifying a part of the above-explained process and a part of the materials for the antireflection film and the plastic lens. In the process for the antireflection film E2 of the 1st variations, the $O_2$ gas pressure in the vacuum evaporation chamber at the undercoat evaporation was maintained at $1.5 \times 10^{-4}$ Torr; the 2nd and 4th layers of the multi-layered film were formed by evaporating a material of a low refractive index, principally composed of $SiO_x$ (2≧x≧1) by known resistance heating or electron beam heating with the $O_2$ pressure in the vacuum evaporation chamber maintained at $1.5 \times 10^{-4}$ Torr, same as in the undercoat evaporation; and the 1st and 3rd layers of the multi-layered film were formed by evaporating a material of a high refractive index, principally composed of $TiO_2$, by known resistance heating or electron beam heating. Other conditions will not be explained as they are same as those in the process for the antireflection film E1 of the above-explained embodiment.

In the process for the antireflection film E3 of the 2nd variation, the 1st and 3rd layers of the multi-layered film were prepared with the $O_2$ pressure in the vacuum evaporation chamber maintained at $1 \times 10^{-4}$ Torr, and with an evaporation rate of 2–3 Å/sec. Other conditions were same as those in the process for the antireflection film E1 of the above-explained embodiment.

The antireflection film E4 of the 3rd variation was prepared employing a plastic lens of polycarbonate (PC). The manufacturing process was same as that for the antireflection film E1 of the above-explained embodiment.

Figure 3:
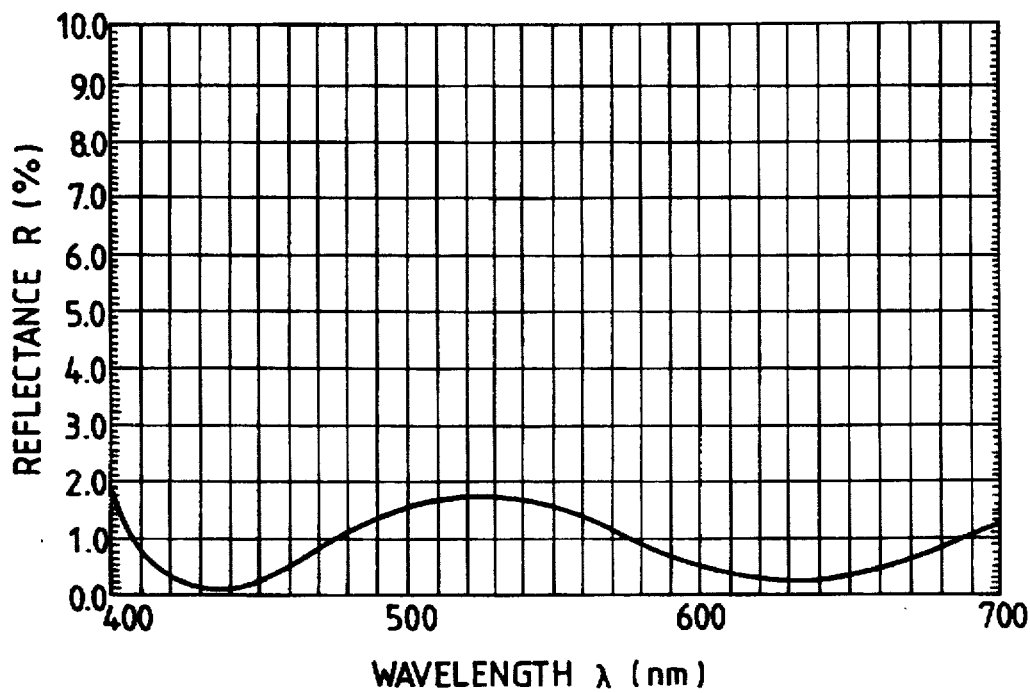
FIG. 3 is a chart showing the antireflective characteristics of a first variation.
Figure 4:
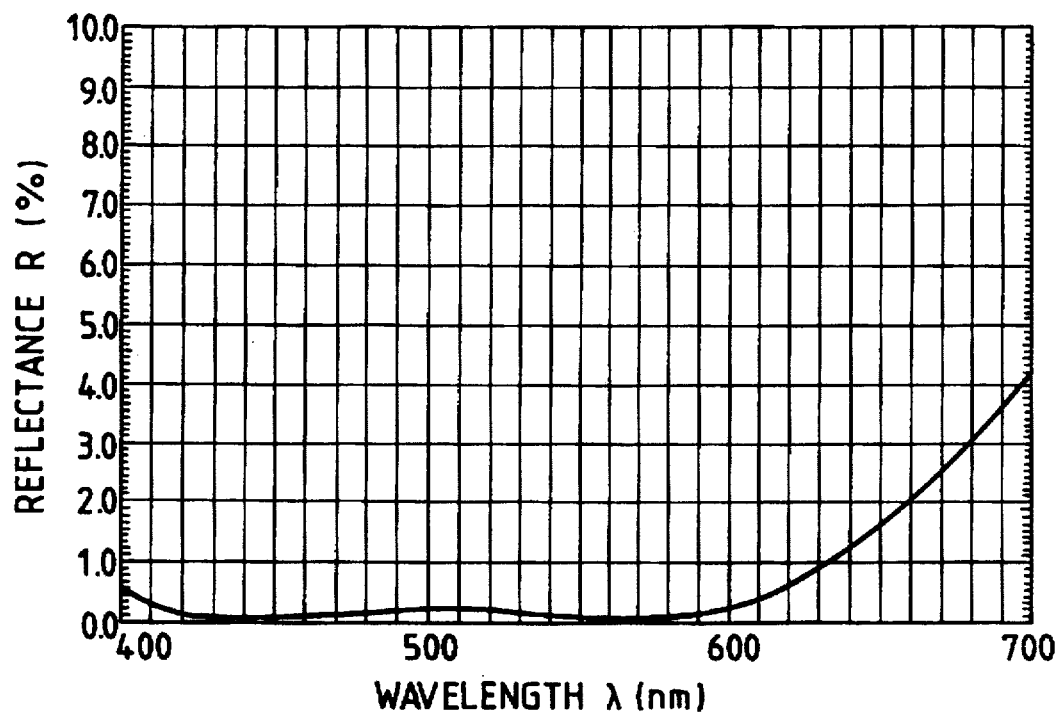
FIG. 4 is a chart showing the antireflective characteristics of a second variation.
Figure 5:
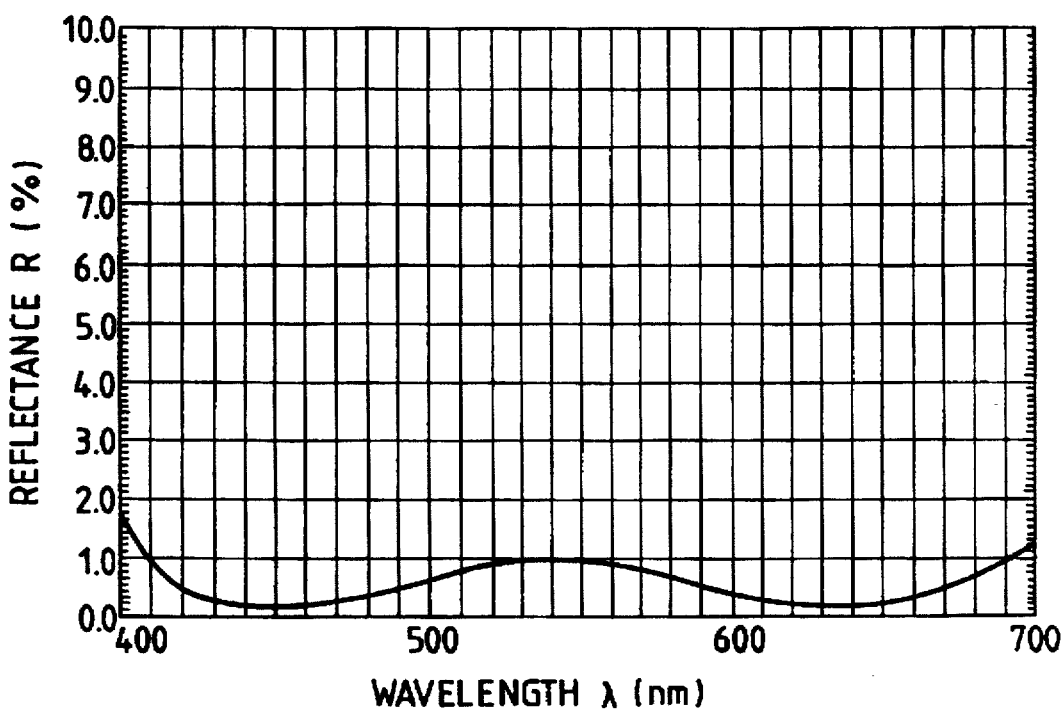
FIG. 5 is a chart showing the antireflective characteristics of a third variation.

The materials, refractive index n, thickness d and optical thickness nd of respective films of the antireflection films E2–E4 constituting the 1st to 3rd variations are shown respectively in Tables 2 to 4, and the respective antireflective characteristics are shown in FIGS. 3 to 5.

TABLE 2

| Composition | Material | Refractive index at 587 nm | Optical thickness nd(d) | |
|---|---|---|---|---|
| | | | nm (nm) | λ = 460 nm |
| 4th layer of multi-layered film | $SiO_x$ (2 ≧ x ≧ 1) | 1.50 | 115 | 0.25λ |
| 3rd layer of multi-layered film | $TiO_2$ | 2.10 | 220 | 0.47λ |
| 2nd layer of multi-layered film | $SiO_x$ (2 ≧ x ≧ 1) | 1.50 | 24 | 0.05λ |
| 1st layer of multi-layered film | $TiO_2$ | 2.10 | 36 | 0.07λ |
| Undercoat | $SiO_x$ 2 > x > 1) | 1.50 | 375(250) | 0.81λ |
| Plastic lens | PMMA | 1.49 | — | — |

TABLE 3

| Composition | Material | Refractive index at 587 nm | Optical thickness nd(d) nm (nm) | λ = 460 nm |
|---|---|---|---|---|
| 4th layer of multi-layered film | SiO$_2$ | 1.44 | 115 | 0.25λ |
| 3rd layer of multi-layered film | ZrO$_2$/TiO$_2$ mixture | 2.14 | 206 | 0.44λ |
| 2nd layer of multi-layered film | SiO$_2$ | 1.44 | 27 | 0.05λ |
| 1st layer of multi-layered film | ZrO$_2$/TiO$_2$ mixture | 2.14 | 28 | 0.06λ |
| Undercoat | SiO$_x$ (2 > x > 1) | 1.53 | 330(215) | 0.71λ |
| Plastic lens | PMMA | 1.49 | — | — |

TABLE 4

| Composition | Material | Refractive index at 587 nm | Optical thickness nd(d) nm (nm) | λ = 490 nm |
|---|---|---|---|---|
| 4th layer of multi-layered film | SiO$_2$ | 1.47 | 122 | 0.25λ |
| 3rd layer of multi-layered film | ZrO$_2$/TiO$_2$ mixture | 2.01 | 205 | 0.41λ |
| 2nd layer of multi-layered film | SiO$_2$ | 1.47 | 20 | 0.04λ |
| 1st layer of multi-layered film | ZrO$_2$/TiO$_2$ mixture | 2.01 | 40 | 0.08λ |
| Undercoat | SiO$_x$ (2 > x > 1) | 1.55 | 462(298) | 0.94λ |
| Plastic lens | PC | 1.59 | — | — |

TABLE 5

| Composition | Material | Refractive index at 587 nm | Optical thickness nd(d) nm (nm) | λ = 480 nm |
|---|---|---|---|---|
| 4th layer of multi-layered film | SiO$_2$ | 1.47 | 120 | 0.25λ |
| 3rd layer of multi-layered film | ZrO$_2$/TiO$_2$ mixture | 2.01 | 227 | 0.47λ |
| 2nd layer of multi-layered film | SiO$_2$ | 1.47 | 31 | 0.06λ |
| 1st layer of multi-layered film | ZrO$_2$/TiO$_2$ mixture | 2.01 | 31 | 0.06λ |
| Undercoat | SiO$_x$ (2 > x > 1) | 1.55 | 279(180) | 0.58λ |
| Plastic lens | PMMA | 1.49 | — | — |

TABLE 6

| Composition | Material | Refractive index at 587 nm | Optical thickness nd(d) nm (nm) | λ = 490 nm |
|---|---|---|---|---|
| 4th layer of multi-layered film | SiO$_2$ | 1.47 | 122 | 0.25λ |
| 3rd layer of multi-layered film | ZrO$_2$/TiO$_2$ mixture | 2.01 | 242 | 0.49λ |
| 2nd layer of multi-layered film | SiO$_2$ | 1.47 | 34 | 0.07λ |
| 1st layer of multi-layered film | ZrO$_2$/TiO$_2$ mixture | 2.01 | 29 | 0.06λ |
| Undercoat | SiO$_x$ (2 > x > 1) | 1.55 | 480(310) | 0.63λ |
| Plastic lens | PMMA | 1.49 | — | — |

Figure 6:
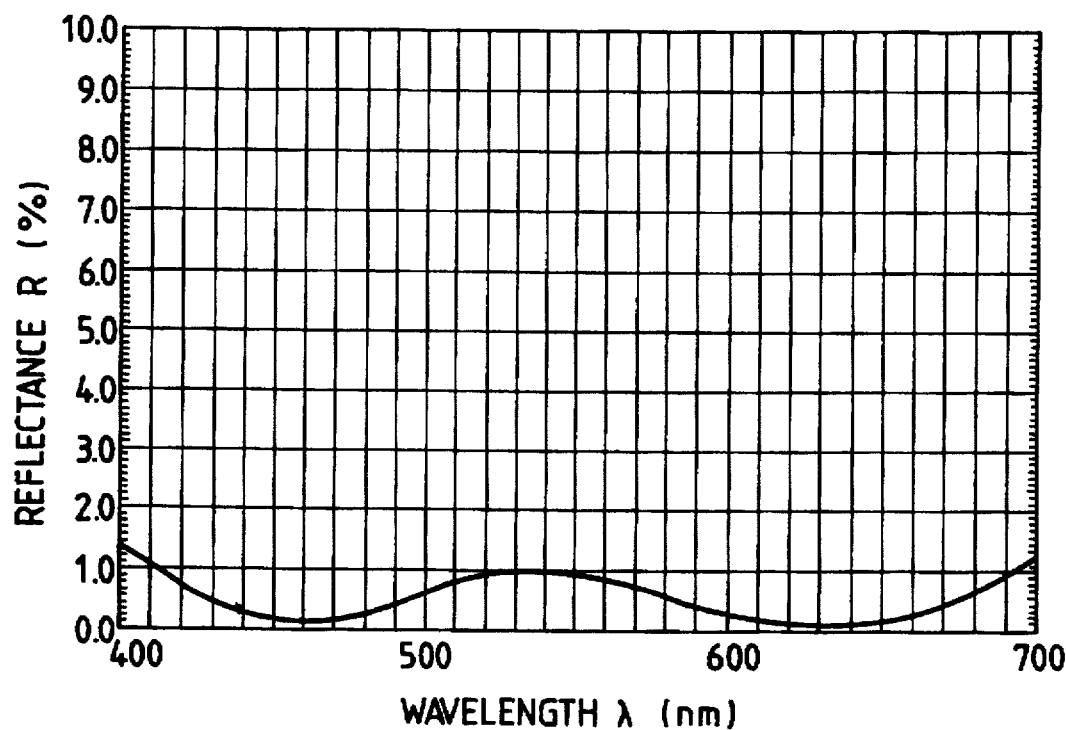
FIG. 6 is a chart showing the antireflective characteristics of a first reference example.
Figure 7:
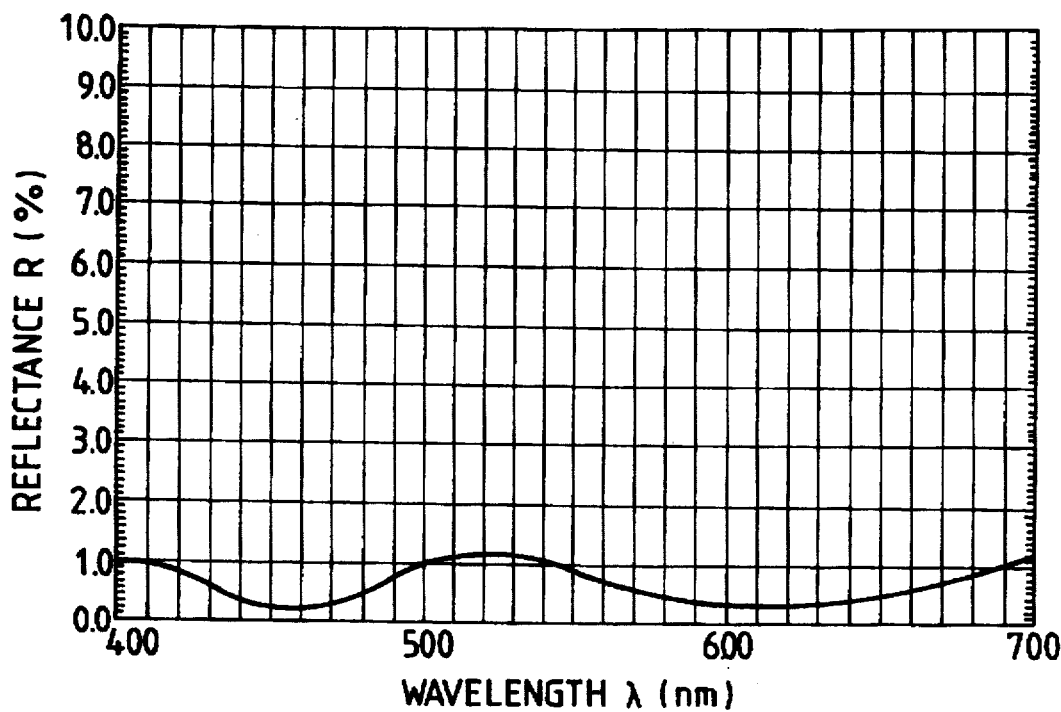
FIG. 7 is a chart showing the antireflective characteristics of a second reference example.

For the purpose of comparison, there were prepared an antireflection film E5 of a first reference example by the same process as that for the antireflection film E1 except that the undercoat had a thickness d=180 nm, and an antireflection film E6 of a second reference example by the same process except that the undercoat had a thickness d=310 nm. The composition, materials, refractive index n and optical thickness nd of each layer are respectively shown in Tables 5 and 6, and the antireflection characteristics of these films are respectively shown in FIGS. 6 and 7.

Following Table 7 summarizes the results of quality evaluation tests on the above-explained antireflection films E1 to E6 and the antireflections films respectively disclosed in the aforementioned Japanese Patent Laid-Open Application Nos. 60-98401, 60-25101 and 3-16101, respectively as conventional examples 1, 2 and 3.

TABLE 7

| Film | Undercoat Material | Undercoat thickness d nm | High refractive index material | Low refractive index material | No. of layers | Optical properties | Initial properties Appearance | Adhesion | Abrasion resistance | Chemical resistance |
|---|---|---|---|---|---|---|---|---|---|---|
| E1 | SiO$_x$ | 208 | ZrO$_2$ + TiO$_2$ | SiO$_2$ | 5 | ○ | ○ | ○ | ○ | ○ |
| E2 | SiO$_x$ | 250 | TiO$_2$ | SiO$_x$ | 5 | ○ | ○ | ○ | ○ | ○ |
| E3 | SiO$_x$ | 215 | ZrO$_2$ + TiO$_2$ | SiO$_2$ | 5 | ○ | ○ | ○ | ○ | ○ |
| E4 | SiO$_x$ | 298 | ZrO$_2$ | SiO$_2$ | 5 | ○ | ○ | ○ | ○ | ○ |

TABLE 7-continued

| | | | + TiO$_2$ | | | | | | | |
|---|---|---|---|---|---|---|---|---|---|---|
| Reference example E5 | SiO$_x$ | 180 | ZrO$_2$ + TiO$_2$ | SiO$_2$ | 5 | ○ | ○ | ○ | ○ | Δ |
| Reference example E6 | SiO$_x$ | 310 | ZrO$_2$ + TiO$_2$ | SiO$_2$ | 5 | ○ | ○ | ○ | ○ | ○ |
| Conventional example 1 | SiO | 89 | — | MgF$_2$ | 2 | ○ | ○ | ○ | X | X |
| Conventional example 2 | SiO$_2$ | 354 | Ta$_2$O$_5$ | SiO$_2$ | 5 | Δ | ○ | ○ | ○ | ○ |
| Conventional example 3 | SiO$_x$ | 18 | TiO$_2$ | SiO$_2$ | 5 | ○ | ○ | ○ | ○ | X |

| | Weather-resistance | | | | | | | | |
|---|---|---|---|---|---|---|---|---|---|
| | High temp-high humidity accelerated test | | | | Heat shock tests | | | | |
| Film | Appearance | Adhesion | Abrasion resistance | Chemical resistance | Appearance | Adhesion | Abrasion resistance | Chemical resistance | Substrate |
| E1 | ○ | ○ | ○ | ○ | ○ | ○ | ○ | ○ | PMMA |
| E2 | ○ | ○ | ○ | ○ | ○ | ○ | ○ | ○ | PMMA |
| E3 | ○ | ○ | ○ | ○ | ○ | ○ | ○ | ○ | PMMA |
| E4 | ○ | ○ | ○ | ○ | ○ | ○ | ○ | ○ | PC |
| Reference example E5 | ○ | ○ | ○ | Δ | ○ | ○ | ○ | Δ | PMMA |
| Reference example E6 | Δ | ○ | Δ | Δ | Δ | ○ | Δ | Δ | PMMA |
| Conventional example 1 | X | X | X | X | X | X | X | X | PMMA |
| Conventional example 2 | Δ | ○ | Δ | Δ | Δ | ○ | Δ | Δ | PMMA |
| Conventional example 3 | ○ | ○ | ○ | X | ○ | ○ | ○ | X | PMMA |

○: Satisfactory
Δ: Partly unacceptable
X: Unacceptable

Results shown in Table 7 indicate that the antireflection film E1 of the present embodiment and those E2–E4 of its variations are excellent in the adhesion, abrasion resistance and chemical resistance, and that these properties are not significantly deteriorated even under harsh conditions of high temperature and high humidity or under conditions involving a large temperature change. On the other hand, the antireflection film E5 of the 1st reference example showed insufficient chemical resistance because of the insufficient thickness of the undercoat, and the antireflection film E6 of the 2nd reference example was prone to generate cracks because of the excessively large thickness of the undercoat. Also as explained before, the conventional examples 1 and 3 showed deficient abrasion and chemical resistances even immediately after the film formation, and the conventional example 2 was defective in the optical characteristics.

In Table 7, (1) adhesion, (2) abrasion resistance, (3) chemical resistance, and (4) weather resistance were evaluated in the following manner.

(1) Adhesion

A cellophane adhesive tape was applied onto the surface of the antireflection film, and was instantly peeled off in a direction perpendicular to the film surface, and the presence or absence of film peeling was inspected visually. The result was evaluated as satisfactory only in case of absence of film peeling.

(2) Abrasion resistance

The surface of antireflection film was rubbed with a piece of silbon paper by fifty reciprocating cycles under a load of 300 g, and the presence of scars was inspected visually. The result was evaluated as satisfactory only in case of absence of the scars.

(3) Chemical resistance

The surface of antireflection film was rubbed with a piece of silbon paper, impregnated with mixed solution of fluorine system solution and alcoholic system solution, by fifty reciprocating cycles under a load of 300 g, and the presence of peeling or scars of the film was inspected visually. The result was evaluated as satisfactory only in case of absence of the peeling or scars of the film.

(4) Weather resistance (4–1) High temperature/high humidity accelerated test

A plastic lens bearing antireflection film was let to stand in a thermostat chamber, maintained at 70° C. and 85 %RH, for 500 hours, and the appearance of the film was inspected visually. The result was evaluated as satisfactory only in case of absence of abnormality. Also there were conducted the evaluations of (1) adhesion, (2) abrasion resistance, and (3) chemical resistance explained above.

(4–2) Heat shock test

A plastic lens bearing antireflection film was subjected to 10 cycles of standing under −30° C. and 60° C. at 60 %RH, for 2 hours, and the appearance of the film was inspected visually. The result was evaluated as satisfactory only in case of absence of abnormality. Also there were conducted the evaluations of (1) adhesion, (2) abrasion resistance, and (3) chemical resistance explained above.

According to the present invention, as explained in the foregoing, the undercoat 2 of a thickness within a range of 200 to 300 nm, principally composed of unsaturated silicon oxide SiO$_x$ (2>x>1) is formed on the surface 1a of the plastic lens 1, and the multi-layered film 3 is laminated on said undercoat 2. The multi-layered film 3 consists of 1st and 3rd layers 3a, 3c of a material of a high refractive index, principally composed of $TiO_2$, $ZrO_2$ or a mixture thereof, and 2nd and 4th layers 3b, 3d of a material of a low refractive index principally composed of silicon oxide $SiO_x$ ($2 \geq x \geq 1$). The undercoat 2 increases the adhesion of the multi-layered film 3 to the surface 1a of the plastic lens 1 and improves the durability thereof such as abrasion resistance and chemical resistances, without deteriorating the antireflective characteristics of the multi-layered film 3.

Owing to the above-explained configuration, the present invention provides the following advantages.

According to the present invention, there is provided an antireflection film, adapted for use in a plastic optical element, excellent in the abrasion resistance, chemical resistance and optical characteristics, and free from deterioration of these properties or from the fear of crack formation or film peeling, even in the prolonged use under harsh conditions of temperature and humidity as those in the outdoor situation, or under conditions involving significant variation in the temperature or in the humidity. As a result, there can be realized a plastic optical element of low reflection, exhibiting excellent durability in the outdoor or similar ambience.

In the following there will be explained another embodiment of the present invention, with reference to the attached drawings.

Figure 8:
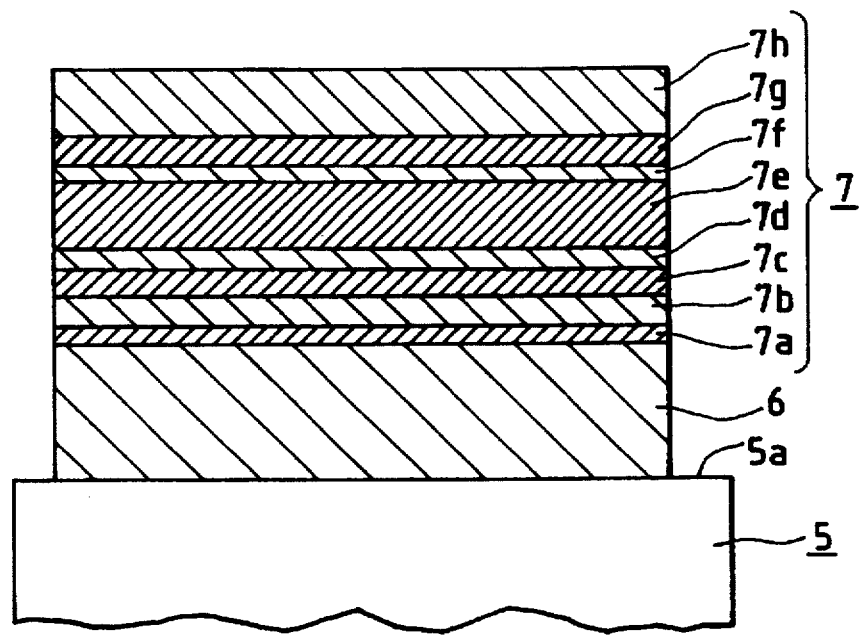
FIG. 8 is a schematic cross-sectional view of a 5th embodiment of the antireflection film of the present invention.

FIG. 8 illustrates an antireflection film of a 5th embodiment, which consists of an undercoat 6 of unsaturated silicon oxide $SiO_x$ ($2>x>1$) having a refractive index of 1.48 at a wavelength of 525 nm and an optical thickness of 236.8 nm, formed on the surface 5a of a substrate 5 such as an acrylic lens, and an 8-layered antireflection film 7, formed on said undercoat and composed of 1st to 8th layers 7a–7h, which are alternately laminated layers, 4 layers each, of a material of a high refractive index and a material of a low refractive index. The above-mentioned multi-layered antireflection film 7 is derived from a 4-layered antireflection film having film configuration of $\lambda/4$-$\lambda/4$-$\lambda/2$-$\lambda/4$, by constituting each of three layers with a 2- or 3-layered equivalent film in order to expand the antireflective spectral range. More specifically, in the 8-layered antireflection film 7, the 1st, 3rd, 5th and 7th layers 7a, 7c, 7e, 7g of the material of a high refractive index are respectively composed of mixture films formed by evaporating a mixture, 1:1 in weight, of titanium oxide $TiO_2$ and zirconium oxide $ZrO_2$, with optical thicknesses of $0.0416\lambda_0$ for the 1st layer 7a, $0.125\lambda_0$ for the 3rd layer 7c, $0.369\lambda_0$ for the 5th layer 7e and $0.127\lambda_0$ for the 7th layer 7g. Also the 2nd, 4th, 6th and 8th layers 7b, 7d, 7f, 7h of the material of a low refractive index are respectively composed of films of silicon dioxide $SiO_2$, with optical thicknesses of $0.132\lambda_0$ for the 2nd layer 7b, $0.0528\lambda_0$ for the 4th layer 7d, $0.0378\lambda_0$ for the 6th layer 7f and $0.278\lambda_0$ for the 8th layer 7h (design wavelength $\lambda_0=525$ nm).

The undercoat 6 and the 8-layered antireflection film 7 were formed by vacuum evaporation. After a substrate 5 of acrylic resin was placed in a vacuum chamber, it was evacuated to $2\times10^{-5}$ Torr and then adjusted to a pressure of $8\times10^{-5}$ Torr by oxygen gas introduction. Then an evaporation source of unsaturated silicon oxide was evaporated by resistance heating to form the undercoat 6 of unsaturated silicon oxide with an evaporation rate of 1 nm/sec. Then the pressure in the vacuum chamber was elevated to $1\times10^{-4}$ Torr by regulating the amount of oxygen introduction, and the layers 7a–7h of the 8-layered antireflection film 7 were formed in succession, with an evaporation rate of 0.8 nm/sec.

Figure 9:
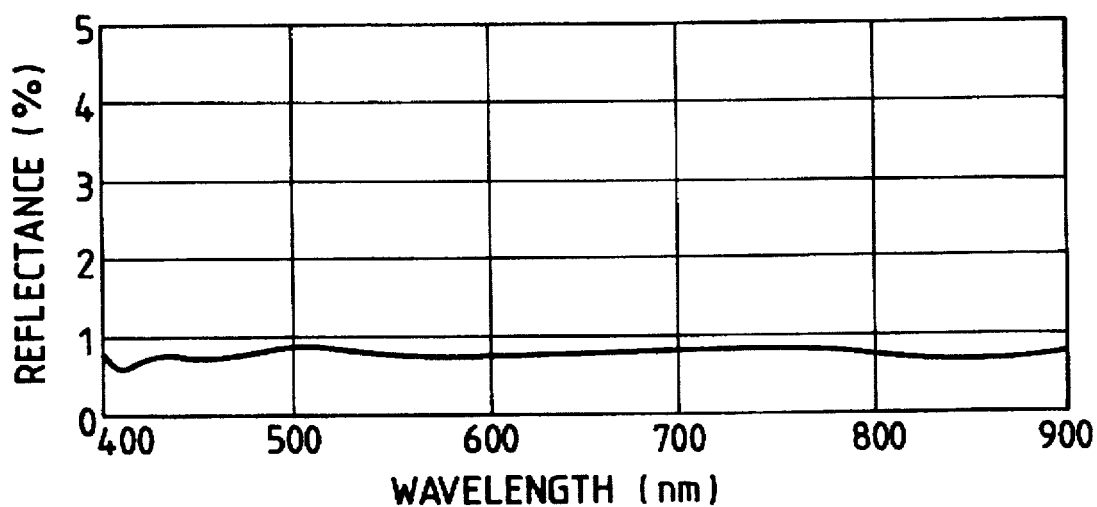
FIG. 9 is a chart showing the spectral reflectance of the 5th embodiment.

FIG. 9 shows the spectral reflectance of the antireflection film of the present 5th embodiment. As shown in this chart, the antireflection film of the 5th embodiment exhibits excellent antireflection characteristics in a wide spectral range including the laser light region and the visible light region, showing a reflectance not exceeding 1% over a spectral range from 400 to 900 nm.

Figure 10:
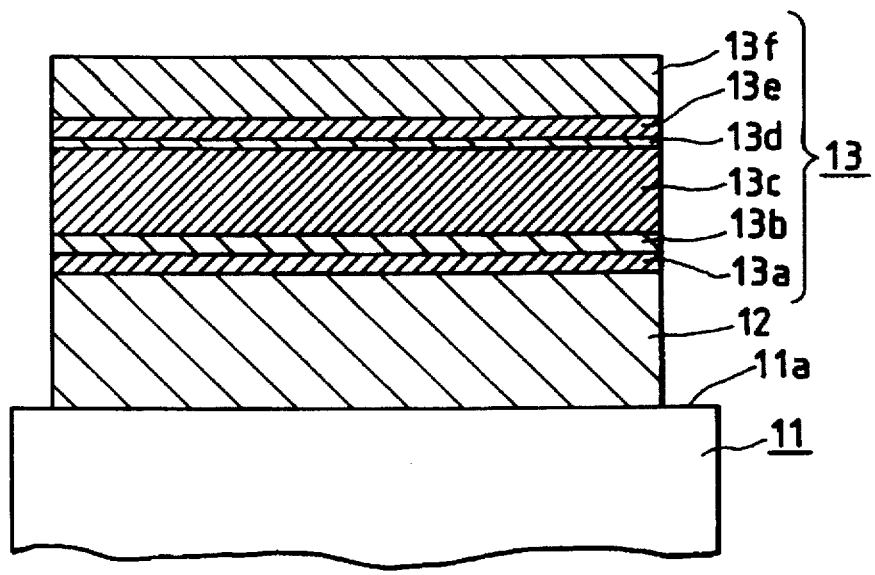
FIG. 10 is a schematic cross-sectional view of a 6th embodiment.

FIG. 10 illustrates an antireflection film of a 6th embodiment, which consists of an undercoat 12 of unsaturated silicon oxide $SiO_x$ ($2>x>1$) having a refractive index of 1.55 at a wavelength of 540 nm and an optical thickness of 340 nm, formed on the surface 11a of a substrate 11 such as a lens of acrylate-styrene copolymer, and a 6-layered antireflection film 13, formed on said undercoat 12 and composed of 1st to 6th layers 13a–13f, alternately composed, 3 layers each, of a material of a high refractive index and a material of a low refractive index. The above-mentioned six-layered antireflection film 13 is derived from the 4-layered antireflection film having film configuration of $\lambda/4$-$\lambda/2$-$\lambda/4$-$\lambda/4$, by constituting each of two layers therein with a 2-layered equivalent film in order to expand the antireflective spectral range. More specifically, in the 6-layered antireflection film 13, the 1st, 3rd and 5th layers 13a, 13c, 13e of the material of a high refractive index are respectively composed of mixture films formed by evaporating a mixture, 1:1 in weight of titanium oxide $TiO_2$ and zirconium oxide $ZrO_2$, with optical thicknesses of $0.07328\lambda_0$ for the 1st layer 13a, $0.4681\lambda_0$ for the 3rd layer, and $0.0755\lambda_0$ for the 5th layer, while the 2nd, 4th and 6th layers 13b, 13d, 13f of the material of a low refractive index are respectively composed of films of silicon dioxide $SiO_2$, with optical thicknesses of $0.07153\lambda_0$ for the 2nd layer 13b, $0.04409\lambda_0$ for the 4th layer 13d and $0.247\lambda_0$ for the 6th layer 13f (design wavelength $\lambda_0=540$ nm).

The undercoat 12 and the layers of the 6-layered antireflection film 13 were formed in the same manner as in the 5th embodiment, except that a pressure of $6\times10^{-5}$ Torr was used for forming the undercoat 12.

Figure 11:
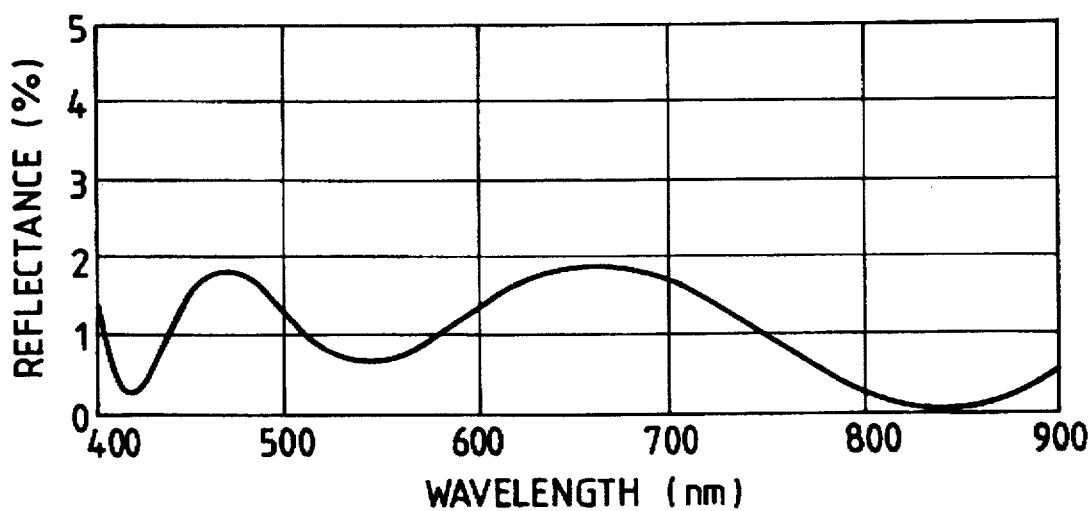
FIG. 11 is a chart showing the spectral reflectance of the 6th embodiment.

FIG. 11 shows the spectral reflectance of the antireflection film of the present 6th embodiment. As shown in this chart, the antireflection film of the 6th embodiment exhibits excellent antireflective characteristics in a wide spectral range including the laser light region and the visible light region, showing a reflectance not exceeding 2% over a spectral range from 400 to 900 nm.

Figure 12:
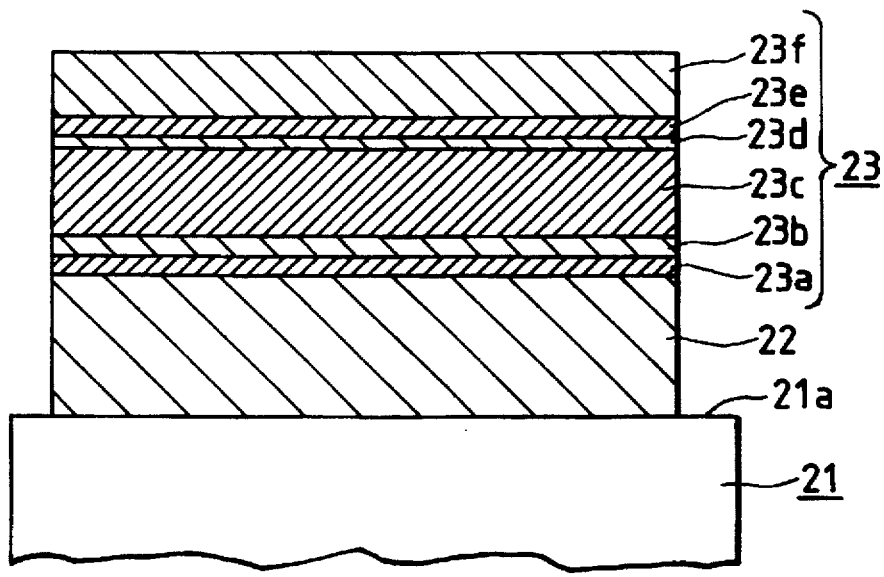
FIG. 12 is a schematic cross-sectional view of a 7th embodiment.

FIG. 12 illustrates an antireflection film of a 7th embodiment, which consists of an undercoat 22 of unsaturated silicon oxide $SiO_x$ ($2>x>1$) having a refractive index of 1.60 at a wavelength of 510 nm and an optical thickness of 435 nm, formed on the surface 21a of a substrate 21 such as a lens of acrylic resin, and a 6-layered antireflection film 23, formed on said undercoat 22 and composed of 1st to 6th layers 23a–23f, alternatively composed, 3 layers each of a material of a high refractive index and a material of a low refractive index. The above-mentioned 6-layered antireflection film 23 is derived from the 4-layered antireflection film having film configuration of $\lambda/4$-$\lambda/2$-$\lambda/4$-$\lambda/4$, by constituting each of two layers therein with a 2-layered equivalent film in order to expand the antireflective spectral range. More specifically, in the 6-layered antireflection film 23, the 1st, 3rd and 5th layers 23a, 23c, 23e of the material of a high refractive index are respectively composed of mixture films formed by evaporating a mixture, 1:1 in weight, of titanium oxide $TiO_2$ and zirconium oxide $ZrO_2$, with optical thicknesses of $0.08142\lambda_0$ for the 1st layer 23a, $0.2202\lambda_0$ for the 3rd layer 23c and $0.1052\lambda_0$ for the 5th layer 23e, while the 2nd, 4th and 6th layers 23b, 23d, 23f of the material of a low refractive index are respectively composed of films of silicon dioxide $SiO_2$, with optical thicknesses of $0.07433\lambda_0$ for the 2nd layer 23b, $0.06717\lambda_0$ for the 4th layer 23d and $0.2815\lambda_0$ for the 6th layer 23f (design wavelength $\lambda_0$=510 nm).

The undercoat 22 and the films of the 6-layered antireflection film 23 were formed in the same manner as in the 5th embodiment, except that a pressure of $5\times10^{-5}$ Torr was used for forming the undercoat 22.

Figure 13:
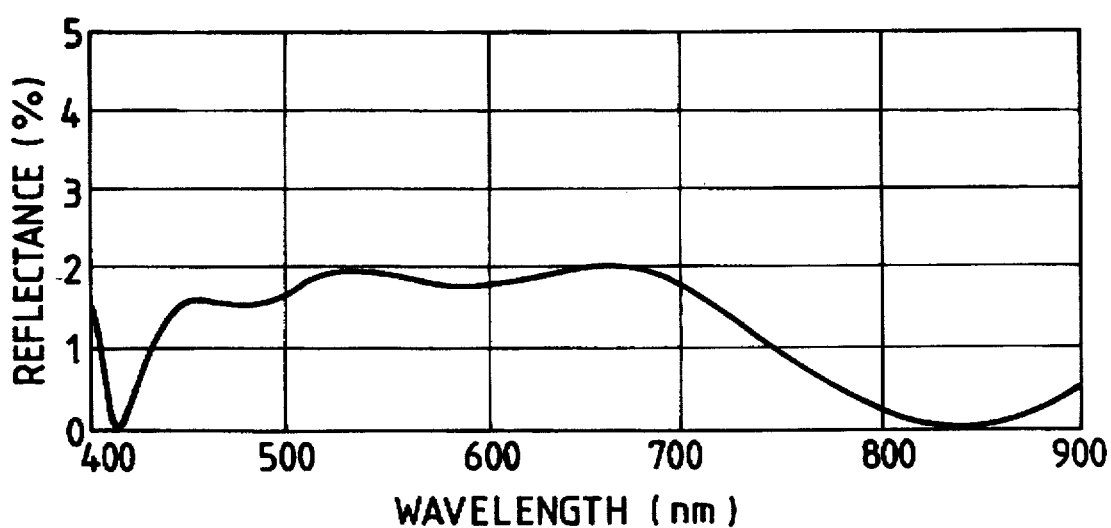
FIG. 13 is a chart showing the spectral reflectance of the 7th embodiment.

FIG. 13 shows the spectral reflectance of the antireflection film of the present 7th embodiment. As shown in this chart, the antireflection film of the 7th embodiment exhibits excellent antireflective characteristics in a wide spectral range including the laser light region and the visible light region, showing a reflectance not exceeding 2% over a spectral range from 400 to 900 nm.

In the antireflection films of the 5th, 6th and 7th embodiments, the antireflective characteristics can be expanded to a sufficiently wide spectral range and the adhesion to the substrate, the chemical and abrasion resistances can be significantly improved if the refractive indexes and optical thicknesses of the undercoat and the layers of the multi-layered antireflective film are within ranges shown in FIG. 8.

TABLE 8

| Layer | Refractive index n | 5th embodiment optical thickness nd | 6th & 7th embodiments optical thickness nd |
|---|---|---|---|
| Undercoat | 1.45–1.60 | 200 nm–480 nm | 200 nm–480 nm |
| 1 | 1.90–2.30 | $0.0330\lambda_0$–$0.0541\lambda_0$ | $0.0650\lambda_0$–$0.0860\lambda_0$ |
| 2 | 1.42–1.47 | $0.0965\lambda_0$–$0.137\lambda_0$ | $0.0505\lambda_0$–$0.112\lambda_0$ |
| 3 | 1.90–2.30 | $0.106\lambda_0$–$0.145\lambda_0$ | $0.180\lambda$–$0.502\lambda$ |
| 4 | 1.42–1.47 | $0.0429\lambda_0$–$0.0624\lambda_0$ | $0.0320\lambda_0$–$0.112\lambda_0$ |
| 5 | 1.90–2.30 | $0.185\lambda_0$–$0.399\lambda_0$ | $0.0558\lambda_0$–$0.120\lambda_0$ |
| 6 | 1.42–1.47 | $0.0280\lambda_0$–$0.0769\lambda_0$ | $0.234\lambda_0$–$0.370\lambda_0$ |
| 7 | 1.90–2.30 | $0.0899\lambda_0$–$0.129\lambda_0$ | — |
| 8 | 1.42–1.47 | $0.259\lambda_0$–$0.331\lambda_0$ | — |

$510 \leq \lambda_0 \leq 550$ (nm)

For the purpose of comparison, the conventional one-layered and four-layered antireflection films were prepared and subjected to the reflectance measurement.

REFERENCE EXAMPLE 3

Figure 14:
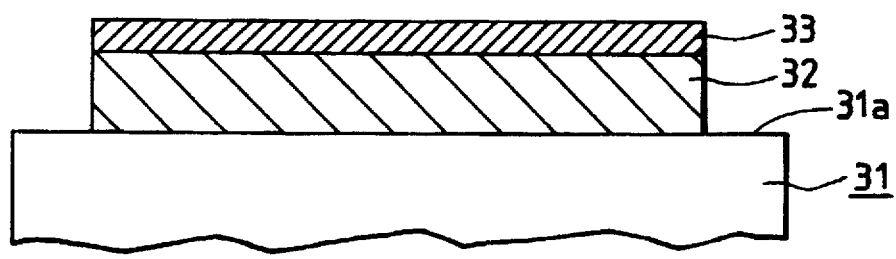
FIG. 14 is a schematic cross-sectional view of a 3rd reference example.

As shown in FIG. 14, an undercoat 32 of a unsaturated silicon oxide $SiO_x$ (2>x>1) having a refractive index of 1.445 at a wavelength of 550 nm and a thickness of 300 nm was formed on the surface 31a of a substrate 31 such as a lens of acrylic resin, and a one-layered antireflection film 33 consisting of $MgF_2$ of a thickness of 28 nm was formed thereon. The undercoat 32 and the one-layered antireflection film 33 were formed by evacuating the vacuum chamber to a pressure of $1\times10^{-4}$ Torr or lower, then regulating the pressure therein to $1.2\times10^{-4}$ Torr by oxygen introduction, evaporating an evaporation source of unsaturated silicon oxide by resistance heating to form the undercoat 32 with an evaporation rate of 1 nm/sec., then evacuating the vacuum chamber to a pressure of $1\times10^{-5}$ Torr or lower by terminating the oxygen supply, and evaporating an evaporation source of $MgF_2$ by resistance heating to deposit the antireflection film 33 with an evaporation rate of 1 nm/sec.

Figure 15:
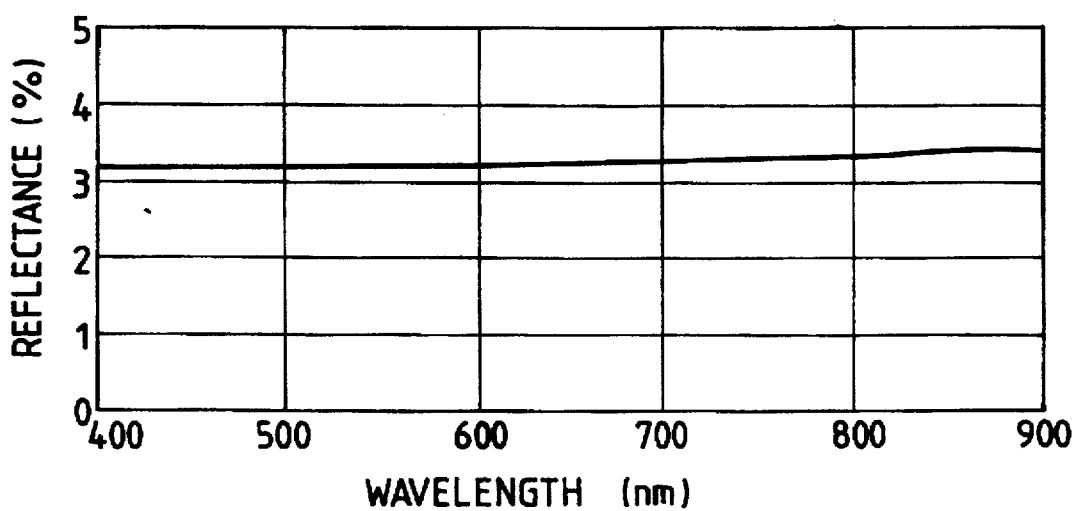
FIG. 15 is a chart showing the spectral reflectance of the 3rd reference example.

FIG. 15 shows the spectral reflectance of the film of the present reference example 3. This chart shows that a sufficient antireflective effect cannot be obtained as the average reflectance in the spectral region from 400 to 900 nm is 3.2%.

REFERENCE EXAMPLE 4

Figure 16:
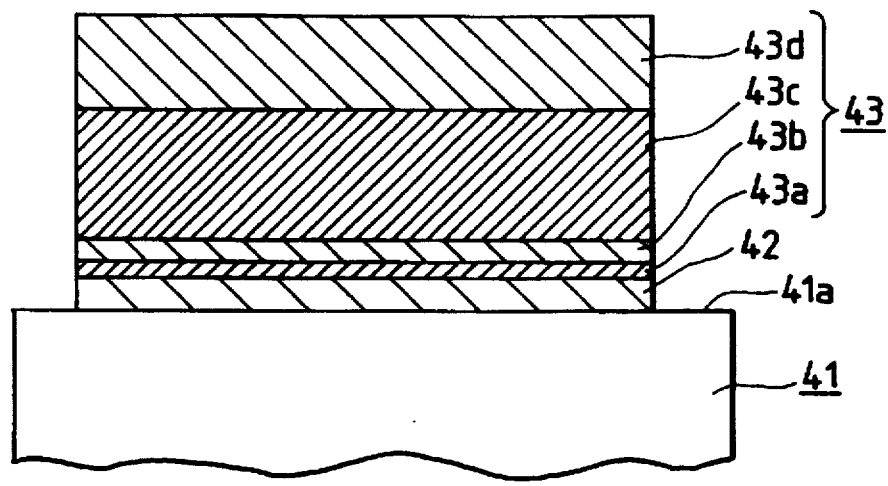
FIG. 16 is a schematic cross-sectional view of a 4th reference example.

As shown in FIG. 16, an undercoat 42 of unsaturated silicon oxide $SiO_x$ (2>x>1) having a refractive index of 1.62 at a wavelength of 550 nm and a thickness of 28.5nm was formed on the surface 41a of a substrate 41 such as a lens of acrylate-styrene copolymer, and there was formed thereon a 4th-layered antireflection film 43 consisting of 1st to 4th layers 43a to 43d, alternately composed of a material of a high refractive index and a material of a low refractive index. The 1st and 3rd layers 43a, 43c of the material of a high refractive index were respectively composed of mixture films formed by evaporating a mixture, 1:1 in weight, of titanium oxide $TiO_2$ and zirconium oxide $ZrO_2$, with optical thicknesses of $0.0518\lambda_0$ for the 1st layer 43a and $0.473\lambda_0$ for the 3rd layer 43c, while the 2nd and 4th layers 43b, 43d of the material of a low refractive index were composed of silicon dioxide $SiO_2$ with optical thicknesses of $0.518\lambda_0$ for the 2nd layer 43b and $0.236\lambda_0$ for the 4th layer 43d ($\lambda_0$=550 nm). The films were formed in the same manner as in the 5th embodiment, except that a pressure of $4\times10^{-4}$ Torr was used for forming the undercoat 42.

Figure 17:
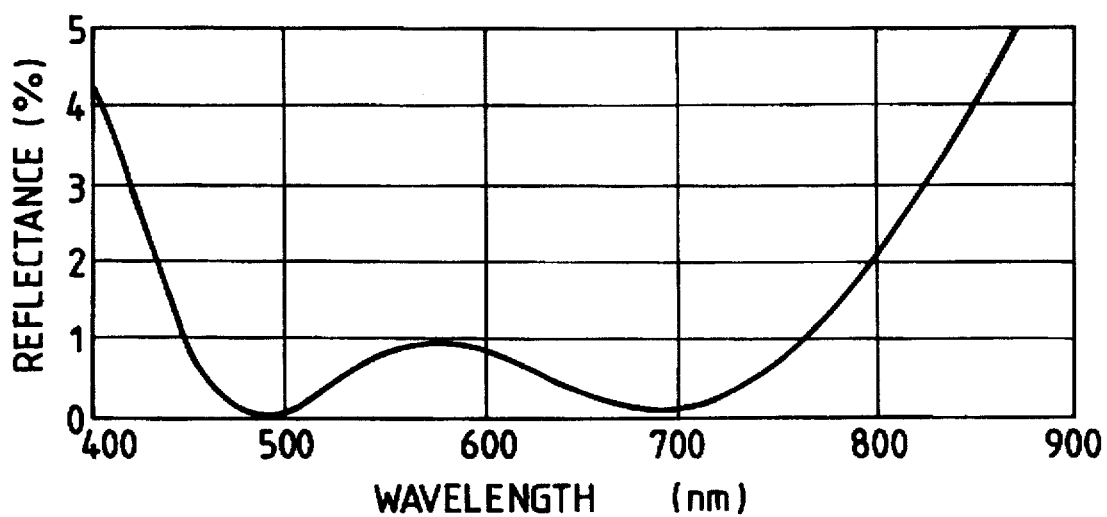
FIG. 17 is a chart showing the spectral reflectance of the 4th reference example.

FIG. 17 shows the spectral reflectance of this reference example 4. This chart indicates that the antireflection film of this reference example 4 shows excellent antireflective characteristics in the visible spectral range from 400 to 900 nm, but the reflectance increases rapidly in the near-infrared region beyond 800 nm.

Table 9 shows the results of evaluations on the spectral characteristics, chemical resistance, abrasion resistance, adhesion to the substrate and durability, on the 5th to 7th embodiments and the 3rd and 4th reference examples.

TABLE 9

|  | Emb. 5 | Emb. 6 | Emb. 7 | Ref. Ex. 3 | Ref. Ex. 4 |
|---|---|---|---|---|---|
| Average reflectance | 0.8% | 1.0% | 1.2% | 3.2% | 1.5% |
| Reflectance at 900 nm | 0.8% | 0.4% | 0.5% | 3.3% | 6.1% |
| Chemical resistance | ○ | ○ | ○ | ○ | partial peeling |
| Abrasion resistance | ○ | ○ | ○ | abraded scars | ○ |
| Adhesion to substrate | ○ | ○ | ○ | partial peeling | totally peeled |
| Durability | ○ | ○ | ○ | cracks | ○ |

The evaluations were conducted in the following manner.

1. Spectral characteristics

Spectral reflectance was measured with a Hitachi #U-3400 auto recording spectrophotometer with a large sample chamber and an integrating ball, employing a 12° normal reflection accessory. The average reflectance Rav was calculated according to the equation (1):

$$Rav = \sum_{i=400}^{900} Ri/501 \qquad (1)$$

wherein Ri is the reflectance measured at a wavelength i.

2. Chemical resistance

Lens cleaning paper (Dusper) made by Ozu Co., impregnated with mixed solution of fluorine system solution and alcoholic system solution was used to rub the surface by 50 reciprocating cycles over a stroke of 2 cm, under a load of 300 g/cm², and the surface was observed.

3. Abrasion resistance

Lens cleaning paper (Dusper) made by Ozu Co., was used to rub the surface by 50 reciprocating cycles over a stroke of 2 cm, under a load of 300 g/cm², and the surface was observed.

4. Adhesion

Adhesive tape, made by Nichiban Co., was adhered to the surface of the antireflection film, and was rapidly peeled off.

5. Durability

The sample was placed in a thermostat chamber of 70° C. and 85 %RH for 168 hours, and the surface was thereafter observed under the indoor condition.

As will be apparent from Table 9, the antireflection films of the 5th and 6th embodiments have low average reflectance and low reflectance at 900 nm, and show satisfactory chemical resistance, abrasion resistance, durability and adhesion to the surface of the plastic optical element.

As explained in the foregoing, the antireflection film of the present invention, for use in a plastic optical element, consists of an undercoat of silicon oxide formed on the surface of the plastic optical element, and a multi-layered film laminated on said undercoat and having at least 6 layers.

Said undercoat is preferably composed of unsaturated silicon oxide, with a refractive index n and a thickness d in the following ranges:

$$1.45 \leq n \leq 1.60$$

$$200 \leq nd \leq 480 \text{(nm)}$$

Also said multi-layered film is preferably composed of alternately laminated layers of a material of a high refractive index, composed of zirconium oxide and titanium oxide, and a material of a low refractive index, composed of silicon dioxide.

In the known 4th-layered antireflection film consisting of a combination of thin layers of optical thicknesses of λ/4 and λ/2, the antireflective characteristics can be extended by increasing the entire number of the layers to at least six, by constituting at least one of the layers with a two- or three-layered equivalent film, whereby significant improvement can be attained in the antireflective characteristics to the light of a wide spectral range, including the visible region and the near-infrared region.

The undercoat consisting of unsaturated silicon oxide and having an optical thickness nd of 200 nm or larger can prevent thermal expansion of the plastic optical element, thereby preventing crack formation in the multi-layered film, and also can improve the chemical and other resistances. On the other hand, an optical thickness exceeding 480 nm increases the internal stress and light absorption in the undercoat, thereby deteriorating the adhesion to the plastic element. Also the refractive index of the undercoat is preferably in a range from 1.45 to 1.60, since a refractive index larger than 1.60 leads to an increased internal stress, while a refractive index smaller than 1.45 results in a porous film formation.

The material of high refractive index, consisting of a mixture of zirconium oxide and titanium oxide, is inexpensive, has a high refractive index, and is free from troubles such as surface denaturing of the plastic optical element or gas generation by heat radiation, as it is not completely fused in the course of film formation. Also the material of low refractive index, consisting of silicon dioxide, can provide a highly hard film even in film formation without heating of the surface of the plastic optical element, and is therefore effective in improving the abrasion resistance and chemical resistance of the plastic optical element.

Owing to the above-explained configuration, the present invention can provide the surface of the surface of the plastic optical element with an antireflection film showing excellent antireflective characteristics to the light of a wide spectral range, including the visible region and the near-infrared region.

What is claimed is:

1. An antireflection film of a plastic optical element, comprising:
   an undercoat formed on the optical element and consisting essentially of unsaturated silicon oxide $SiO_x$ (2>x>1) with a thickness within a range from 200 to 300 nm; and
   a multi-layered film of a repeating structure, formed on said undercoat and having antireflective characteristics.

2. An antireflection film according to claim 1, wherein said undercoat consisting essentially of unsaturated silicon oxide $SiO_x$ (2>x>1) has a refractive index within a range from 1.49 to 1.59.

3. An antireflection film according to claim 1, wherein said multi-layered film of repeating structure is composed of alternate lamination of a layer of a material of a high refractive index, consisting essentially of $TiO_2$, $ZrO_2$ or a mixture thereof, and a layer of a material of a low refractive index, consisting essentially of $SiO_x$ (2 ≥ x ≥ 1).

4. An antireflection film according to claim 3, wherein said multi-layered film of repeating structure is composed of four layers, respectively having refractive indexes and optical thicknesses in the following ranges:

$$1.95 \leq n_1 \leq 2.15$$

$$1.43 \leq n_2 \leq 1.55$$

$$1.95 \leq n_3 \leq 2.15$$

$$1.43 \leq n_4 \leq 1.55$$

$$0.05\lambda \leq n_1 d_1 \leq 0.13\lambda$$

$$0.03\lambda \leq n_2 d_2 \leq 0.07\lambda$$

$$0.21\lambda \leq n_3 d_3 \leq 0.49\lambda$$

$$0.20\lambda \leq n_4 d_4 \leq 0.28\lambda$$

wherein
  λ: design wavelength of 500 nm;
  $n_1$: refractive index of the 1st layer;
  $n_2$: refractive index of the 2nd layer;
  $n_3$: refractive index of the 3rd layer;
  $n_4$: refractive index of the 4th layer;
  $n_1 d_1$: optical thickness of the 1st layer;
  $n_2 d_2$: optical thickness of the 2nd layer;
  $n_3 d_3$: optical thickness of the 3rd layer;
  $n_4 d_4$: optical thickness of the 4th layer;
in which the 1st to 4th layers are counted in the order from the surface of the plastic optical element.

5. An antireflection film of a plastic optical element, comprising:
   an undercoat formed on the optical element and consisting essentially of silicon oxide $SiO_x$ (2>x>1), wherein the geometric film thickness d of $SiO_x$ (2>x>1) is within a range of 200 to 300 nm; and
   a multi-layered film formed on said undercoat and containing at least six layers, said multi-layered film having certain antireflective characteristics to the light within a spectral range including at least the visible spectral region and the near-infrared spectral region.

6. An antireflective film according to claim 5, wherein said undercoat is composed of unsaturated silicon oxide and has a refractive index n and a thickness d within the following ranges:

$$1.45 \leq n \leq 1.60$$

$$290 \leq nd \leq 480 \text{ nm}.$$

7. An antireflection film according to claim 5, wherein said multi-layered film is composed of alternate lamination of a layer of a material of a high refractive index consisting of zirconium oxide and titanium oxide, and a layer of a material of a low refractive index, consisting of silicon dioxide.

8. An antireflection film according to claim 5, wherein said multi-layered film, formed on said undercoat, is composed of alternate lamination of three layers of a material of a high refractive index and three layers of a material of a low refractive index, wherein the refractive indexes of said materials of high and low refractive indexes and thicknesses of said layers are defined by the following relations:

$$0.0650\lambda_0 \leq n_1 d_1 \leq 0.0860\lambda_0$$

$$0.0505\lambda_0 \leq n_2 d_2 \leq 0.112\lambda_0$$

$$0.180\lambda_0 \leq n_1 d_3 \leq 0.502\lambda_0$$

$$0.0320\lambda_0 \leq n_2 d_4 \leq 0.112\lambda_0$$

$$0.0558\lambda_0 \leq n_1 d_5 \leq 0.120\lambda_0$$

$$0.234\lambda_0 \leq n_2 d_6 \leq 0.370\lambda_0$$

$$1.90 \leq n_1 \leq 2.30$$

$$1.42 \leq n_2 \leq 1.47$$

$$510 \leq \lambda_0 \leq 550 \text{ nm}$$

in which $n_1$: refractive index of material of high refractive index;

$n_2$: refractive index of material of low refractive index;

$d_x$: (x=1, 2, . . . , 6): thickness of an x-th layer counted from the side of the undercoat;

$\lambda_0$: design wavelength.

9. An antireflection film according to claim 5, wherein said multi-layered film, formed on said undercoat, is composed of alternate lamination of four layers of material of a high refractive index and four layers of a material of a low refractive index, wherein the refractive indexes of said materials of high and low refractive indexes and thicknesses of said layers are defined by the following relations:

$$0.0330\lambda_0 \leq n_1 d_1 \leq 0.0541\lambda_0$$

$$0.0965\lambda_0 \leq n_2 d_2 \leq 0.137\lambda_0$$

$$0.106\lambda_0 \leq n_1 d_3 \leq 0.145\lambda_0$$

$$0.0429\lambda_0 \leq n_2 d_4 \leq 0.0624\lambda_0$$

$$0.185\lambda_0 \leq n_1 d_5 \leq 0.339\lambda_0$$

$$0.0280\lambda_0 \leq n_2 d_6 \leq 0.0769\lambda_0$$

$$0.0889\lambda_0 \leq n_1 d_7 \leq 0.129\lambda_0$$

$$0.259\lambda_0 \leq n_2 d_8 \leq 0.331\lambda_0$$

$$1.90 \leq n_1 \leq 2.30$$

$$1.42 \leq n_2 \leq 1.47$$

in which $n_1$: refractive index of material of high refractive index;

$n_2$: refractive index of material of low refractive index;

$d_x$: (x=1, 2, . . . , 8): thickness of an x-th layer counted from the side of the undercoat.

10. An antireflection film of a plastic optical element comprising:

an undercoat formed on the optical element and consisting essentially of unsaturated silicon oxide $SiO_x$ (2>x>1) with a thickness within a range from 200 to 300 run; and a multi-layered film of a repeating structure, formed on said undercoat and having antireflective characteristics, wherein said undercoat consisting essentially of unsaturated silicon oxide $SiO_x$ (2>x>1) has a refractive index within a range from 1.49 to 1.59.

11. An antireflection film according to claim 10, wherein said multi-layered film of repeating structure is composed of alternate lamination of a layer of a material of a high refractive index, consisting essentially of $TiO_2$, $ZrO_2$ or a mixture thereof, and a layer of a material of a low refractive index, consisting essentially of $SiO_x$ ($2 \leq x \leq 1$).

12. An antireflection film according to claim 11, wherein said multi-layered film of repeating structure is composed of four layers, respectively having refractive indexes and optical thicknesses in the following ranges:

$$1.95 \leq n_1 \leq 2.15$$

$$1.43 \leq n_2 \leq 1.55$$

$$1.95 \leq n_3 \leq 2.15$$

$$1.43 \leq n_4 \leq 1.55$$

$$0.05\lambda \leq n_1 d_1 \leq 0.13\lambda$$

$$0.03\lambda \leq n_2 d_2 \leq 0.07\lambda$$

$$0.21\lambda \leq n_3 d_3 \leq 0.49\lambda$$

$$0.20\lambda \leq n_4 d_4 \leq 0.28\lambda$$

wherein $\lambda$: design wavelength of 500 nm;

$n_1$: refractive index of the 1st layer;

$n_2$: refractive index of the 2nd layer;

$n_3$: refractive index of the 3rd layer;

$n_4$: refractive index of the 4th layer;

$n_1 d_1$: optical thickness of the 1st layer;

$n_2 d_2$: optical thickness of the 2nd layer;

$n_3 d_3$: optical thickness of the 3rd layer;

$n_4 d_4$: optical thickness of the 4th layer;

in which the 1st to 4th layers are counted in the order from the surface of the plastic optical element.

* * * * *

UNITED STATES PATENT AND TRADEMARK OFFICE
CERTIFICATE OF CORRECTION

PATENT NO. : 5,725,959

DATED : March 10, 1998

INVENTOR(S) : Junji TERADA, et al.

Page 1 of 3

It is certified that error appears in the above-identified patent and that said Letters Patent is hereby corrected as shown below:

ON THE COVER PAGE

AT [57] ABSTRACT

Line 1, "procided" should read --provided--.
Line 6, "multi-layerd" should read --multi-layered--.

COLUMN 5

Line 36, "$ZrO_2\ _2$" should read --$ZrO_2$--.

COLUMN 8

Line 45, "antireflections" should read --antireflection--.

UNITED STATES PATENT AND TRADEMARK OFFICE
CERTIFICATE OF CORRECTION

PATENT NO.   :  5,725,959

DATED        :  March 10, 1998

INVENTOR(S)  :  Junji TERADA, et al.

It is certified that error appears in the above-identified patent and that said Letters Patent is hereby corrected as shown below:

COLUMN 12

Line 29, "$0.0755\lambda_0$" should read --$0.07556\lambda_0$--.
    Line 33, "$0.247\lambda_0$" should read --$0.2470\lambda_0$--.

COLUMN 13

Line 43, "of a" should read --of an--.

COLUMN 15

Line 56, "the surface of" (first occurrence) should be deleted.

UNITED STATES PATENT AND TRADEMARK OFFICE
CERTIFICATE OF CORRECTION

PATENT NO. : 5,725,959

DATED : March 10, 1998

INVENTOR(S): Junji TERADA, et al.

It is certified that error appears in the above-identified patent and that said Letters Patent is hereby corrected as shown below:

COLUMN 18

Line 6, "undercoat." should read
--undercoat;
$\lambda_0$: design wavelength.--.
Line 10, "run" should read --nm--.
Line 22, "$(2 \leq x \leq 1)$" should read --$(2 \geq x \geq 1)$--.
Line 28, "$1.95 \leq n_1 2.15$" should read --$1.95 \leq n_1 \leq 2.15$--.
Line 29, "$1.43 \leq n_2 1.55$" should read --$1.43 \leq n_2 \leq 1.55$--.
Line 30, "$1.95 \leq n_3 2.15$" should read --$1.95 \leq n_3 \leq 2.15$--.
Line 31, "$1.43 \leq n_4 1.55$" should read --$1.43 \leq n_4 \leq 1.55$--.

Signed and Sealed this

First Day of December, 1998

Attest:

BRUCE LEHMAN

Attesting Officer

Commissioner of Patents and Trademarks